United States Patent [19]
Boydstun, IV et al.

[11] Patent Number: 5,836,730
[45] Date of Patent: Nov. 17, 1998

[54] TIE-DOWN SYSTEM FOR VEHICLE TRANSPORTER

[75] Inventors: Robert D. Boydstun, IV, Clackamas; John T. Huey, Milwaukie; Todd Papasadero, Portland, all of Oreg.

[73] Assignee: Boydstun Metal Works, Inc., Portland, Oreg.

[21] Appl. No.: 801,188

[22] Filed: Feb. 18, 1997

Related U.S. Application Data

[63] Continuation-in-part of Ser. No. 658,497, Jun. 5, 1996, Pat. No. 5,746,554.
[51] Int. Cl.$^6$ .................................................. B60P 7/08
[52] U.S. Cl. ................................. 410/12; 410/7; 410/10; 410/19; 410/23
[58] Field of Search ............................. 410/4, 7–12, 19, 410/21–23, 103; 248/499

[56] References Cited

U.S. PATENT DOCUMENTS

| | | | |
|---|---|---|---|
| 3,595,598 | 7/1971 | Nuzum | 410/23 |
| 4,068,813 | 1/1978 | Chatwin et al. | 410/7 |
| 4,993,898 | 2/1991 | Klabold | 410/12 |

OTHER PUBLICATIONS

Photographs of Japanese tie–down systems for vehicle transporters (1994) (originals of photographs are in parent application), 20 pages.

*Primary Examiner*—Stephen T. Gordon
*Attorney, Agent, or Firm*—Chernoff, Vilhauer, McClung & Stenzel, LLP

[57] ABSTRACT

A tie-down apparatus for securing a vehicle to a longitudinally-extending elongate vehicle transporter comprises a vehicle support assembly and at least four securement devices associated with the vehicle support assembly and attachable to the vehicle. A respective tension member portion is interconnected with a respective one of each of the four securement devices. Each tension member portion is capable of exerting a pull-down force on a respective one of the securement devices. A tension-applying mechanism is interconnected with each tension member portion to adjust the pull-down force on each of the securement devices. A tension-equalizing mechanism is interconnected with each tension member portion and is capable of automatically substantially equally distributing tension applied by the tension-applying mechanism among each tension member portion, to substantially equalize the pull-down force automatically with respect to the four securement devices. A tension-limiting mechanism is interconnected with the tension-applying mechanism and is capable automatically of limiting the pull-down force exerted by the tension member to a predetermined amount.

19 Claims, 8 Drawing Sheets

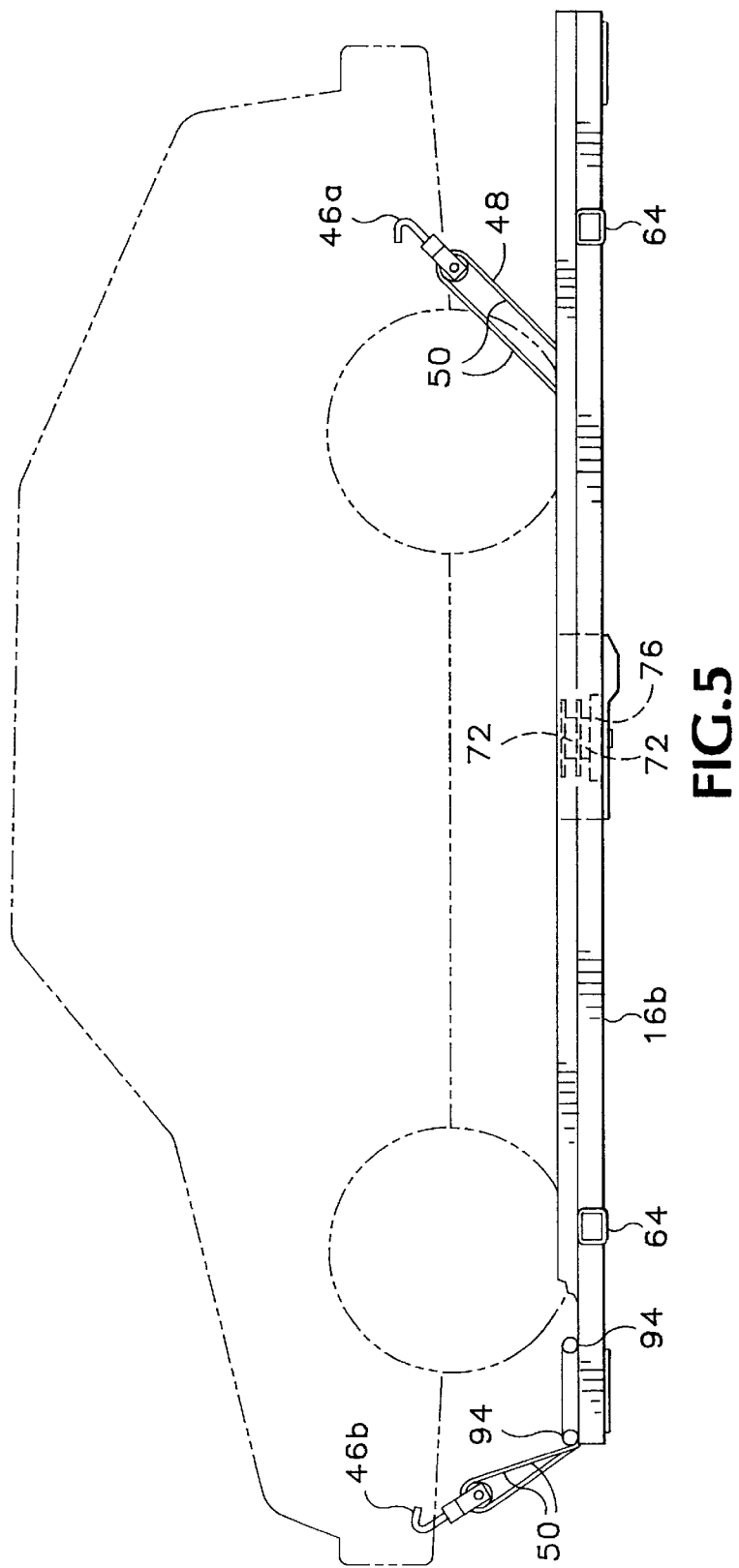

TIE-DOWN SYSTEM FOR VEHICLE TRANSPORTER

This application is a continuation-in-part of application Ser. No. 08/658,497 filed Jun. 5, 1996, now U.S. Pat. 165,746,554.

BACKGROUND OF THE INVENTION

The present invention relates to vehicle transporters, such as trucks, trailers, railcars and the like, which have a tie-down apparatus for securing a vehicle to the vehicle transporter.

Vehicle transporters, such as truck/trailer combinations, are capable of elevating and orienting numerous automobiles in tightly stacked configurations on one or more vehicle support assemblies. Traditionally, vehicles have been secured to vehicle transporters using chains or cables. Often these devices include a four point chain system for securing the four corners of the vehicle. One or more ratcheting devices are actuated to place the chains in tension so as to restrain the automobile from movement during transit. The vehicles must be secured longitudinally so that the vehicles will not roll off the vehicle support assembly in response to acceleration or braking of the vehicle transporter. It is also advantageous to pull down on the vehicles to lower the height of the vehicles, so that additional vehicles may be stacked on the vehicle transporter. It is also important to be able to quickly secure the vehicles to the vehicle transporter.

One prior art system includes four separate chains, each of which is connected to a separate winch which must be manually tightened. Each chain may be attached to the vehicle using a hook. Each chain may be engaged with one of several longitudinally spaced rollers which are mounted on the vehicle support assembly, thus allowing the positions of the chains to be longitudinally adjusted so as to pull down at opposing longitudinal inclinations to longitudinally stabilize the vehicle.

However, there are several drawbacks with this tie-down system. Vehicles are often damaged during the tie-down because of several operator controlled factors. First, operators over tighten the chains, applying too much tension for the vehicle to accommodate. Second, operators do not uniformly adjust the tension in the four chains. The difference in tension between the different securement points on the vehicle can lead to buckling or warping of the body of the automobile, or breakage of the securement points. Vehicle manufacturers must therefore build heavier vehicles to accommodate the excess and differential strain that may be imposed by such a tie-down system. In addition, because the four winches are located near the four corners of the vehicle, the operator must walk around the vehicle transporter to adjust the winches. Large trailers may be seventy feet or more in length, and operators who secure vehicles to such trailers often do not readjust winches because to do so would mean many time-consuming trips around the vehicle transporter. If cables rather than chains are used, the winches used to tighten the cables also pose other problems. Cables can become worn, deformed or damaged when repeatedly wound around the winches used to tighten the cables.

Nuzum U.S. Pat. No. 3,595,598 discloses a trailer with unitary tie-down control. The trailer has two control cables, each with hooks for securing to a vehicle. The control cables are threaded through a loop member which is connected to a winch for tightening the control cables. Each cable attaches to a front and rear end of the vehicle. The winch provides for simultaneous tensioning of the control cables. However, the tie down apparatus provides uniform tensioning only between the ends of a single cable, and not between both control cables, and therefore does not provide uniform tensioning automatically at all four securement points if the relative positions of the hooks are varied nonuniformly, as in normal usage due to unsymmetrical locations of securement points on different types of vehicles. In addition, this tie-down system does not provide for longitudinal adjustability of the positions of the cable ends, and thus does not enable longitudinally opposed, angled pull-downs on the hooks for longitudinal stability of vehicles regardless of their length. It also does not limit the amount of force that may be exerted by the cables on the vehicle.

In another prior art system, the vehicle is secured to the vehicle transporter using two cables. The cables are attached to either opposite sides or opposite ends of the vehicle. At one end of the vehicle, the cable is secured at two points to the vehicle support assembly and secured to the vehicle at a point in between those two points, so that the cable provides a resultant straight pull-down force to the vehicle at that end. Because this tie-down apparatus results in a straight pull-down being exerted at one end of the vehicle, it is necessary to use chocking blocks to secure the vehicle longitudinally. This system also does not achieve uniform pull-down force automatically at all four securement points on the vehicle, and does not limit the amount of pull-down force.

What is therefore desired is a tie-down system for a vehicle transporter that automatically equalizes the pull-down forces at all four points of securement of the vehicle, that allows the tension in the cables securing the vehicle to be adjusted simultaneously from one side of the vehicle transporter, that limits to a predetermined amount the pull-down force which may be applied to secure a vehicle, which does not cause deformation or wear of the cable due to repeated windings around a winch, and which does not require additional devices to longitudinally secure a vehicle regardless of its length.

SUMMARY OF THE INVENTION

The present invention overcomes the aforementioned drawbacks of the prior art by providing an improved tie-down system to secure a vehicle to a longitudinally extending elongate vehicle transporter. A first aspect of the present invention comprises a vehicle support assembly, with at least four variably positionable securement devices associated with the vehicle support assembly and attachable to the vehicle. A respective flexible tension member portion is interconnected with a respective one of each of the four securement devices to enable nonuniform variations in their relative positions to accommodate unsymmetrical locations of securement points on different types of vehicles. Each tension member portion is capable of exerting a pull-down force on a respective one of the securement devices. A tension-applying mechanism is interconnected with each tension member portion to adjust the pull-down force on each of the securement devices. A tension-equalizing mechanism is interconnected with each tension member portion and is capable of automatically substantially equally distributing tension applied by the tension-applying mechanism among each tension member portion, to substantially equalize the pull-down force automatically with respect to the four securement devices despite nonuniform variations in their relative positions.

Preferably, the securement devices are both longitudinally-spaced and transversely-spaced with respect to each other, and the tension-equalizing mechanism interconnects respective transversely-spaced ones of the securement devices in tension while also interconnecting respective longitudinally-spaced ones of the securement devices in tension. In a preferred embodiment, the tension-equalizing mechanism interconnects respective longitudinally-spaced ones of the securement devices in tension independently of any interconnection thereof through the vehicle. In the alternative, the tension-equalizing mechanism interconnects respective longitudinally-spaced ones of the securement devices in tension through the vehicle.

This first aspect of the present invention has several advantages over the prior art. The uniform tension prevents warping or buckling of the vehicle body, and breakage of the securement points on the vehicle, caused by different pull-down forces exerted by the various tension member portions. It is also not necessary for the operator to adjust several tension-applying mechanisms to obtain uniform tension, and therefore the operator need not travel around the vehicle transporter to adjust each tension member portion. Because the tension-applying mechanism is interconnected to all four securement devices, the vehicle may be secured quickly to the vehicle support assembly.

A second aspect of the invention comprises a vehicle support assembly, and a securement device associated with the vehicle support assembly and attachable to the vehicle. A flexible tension member is interconnected with the securement device. The tension member is capable of exerting a pull-down force on the securement device. The tension-applying mechanism is interconnected with the tension member to adjust the pull-down force. A tension-limiting mechanism is interconnected with the tension-applying mechanism and is capable automatically of limiting the pull-down force exerted by the tension member to a predetermined amount.

This second aspect of the invention has the advantage that it limits the amount of pull-down force that may be exerted by the tension members. This also prevents damage to the body of the vehicle due to excessive pull-down force, and allows manufacturers to build lighter weight vehicles that do not need to withstand over tightening of a tension member.

A third aspect of the invention comprises a vehicle support assembly with at least four securement devices associated with the vehicle support assembly and attachable to the vehicle. A respective flexible tension member portion interconnects with a respective one of each of the four securement devices. Each tension member portion is capable of exerting a pull-down force on a respective one of the securement devices. A tension-applying mechanism interconnects with each tension member portion to adjust the pull-down force on each of the securement devices. Each tension member portion is capable of exerting the pull-down force through at least two side-by-side parts of each tension member portion.

This third aspect of the present invention provides for a greater mechanical advantage in applying the pull-down force to the securement device. Because the tension member exerts a pull-down force through two side-by-side parts, not as much tension is required to be applied to the tension member to achieve the necessary pull-down force required to secure the vehicle.

A fourth aspect of the invention comprises a vehicle support assembly, and a securement device associated with the vehicle support assembly and attachable to the vehicle. A flexible tension member is interconnected with the securement device. The tension member is capable of exerting a pull-down force on the securement device. A tension-applying mechanism is interconnected with the tension member to adjust the pull-down force. A tension member storage assembly has at least one pulley about which the tension member is wrapped, and a carriage selectively movable with respect to the vehicle support assembly and the axis of the pulley along a direction substantially perpendicular to such axis in response to adjustment of the pull-down force by the tension-applying mechanism. The carriage engages the tension member portion so as to variably store a length of the tension member portion between the carriage and the pulley.

The fourth aspect of the invention has several advantages. It provides a storage space for the tension member which does not require repeated windings about a winch, thus preventing deformation and wear of the tension-member portion which would otherwise be caused by such repeated windings. The fourth aspect also allows the tie-down apparatus to accommodate a wide range of vehicles, as a significant amount of slack in the tension member may be stored in the tension member storage assembly.

A fifth aspect of the invention comprises a method for securing a vehicle to a longitudinally-extending vehicle support assembly having transversely-spaced opposite sides. At least a respective pair of longitudinally-spaced securement devices are attached to the vehicle adjacent each of the sides. A respective flexible tension member portion is interconnected with each of the securement devices. Each tension member portion is capable of exerting a respective pull-down force on a respective one of the securement devices. A tension-applying mechanism is interconnected with each tension member portion, capable of automatically simultaneously distributing tension applied by the tension-applying mechanism among each tension member portion. At least one tension member portion is engaged with the vehicle support assembly adjacent each of the sides at a selected one of different longitudinally spaced positions, and exerting a resultant pull-down force on each of the securement devices, so that each resultant pull-down force exerted on a respective one of the pair of longitudinally spaced securement devices has a longitudinal inclination opposing the resultant pull-down force exerted on another of the pair of longitudinally spaced securement devices. Each respective pull-down force on each of the securement devices is simultaneously adjusted to secure the vehicle to the vehicle support assembly.

The fifth aspect of the invention provides for a method of securing a vehicle longitudinally with respect to the vehicle support assembly by means of a tie-down system regardless of the vehicle's length. Thus it is not necessary to use chocking blocks or other devices to longitudinally secure the vehicle.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 5 is a side view taken along line 5—5 of FIG. 2.

DETAILED DESCRIPTION OF THE INVENTION

Figure 1:
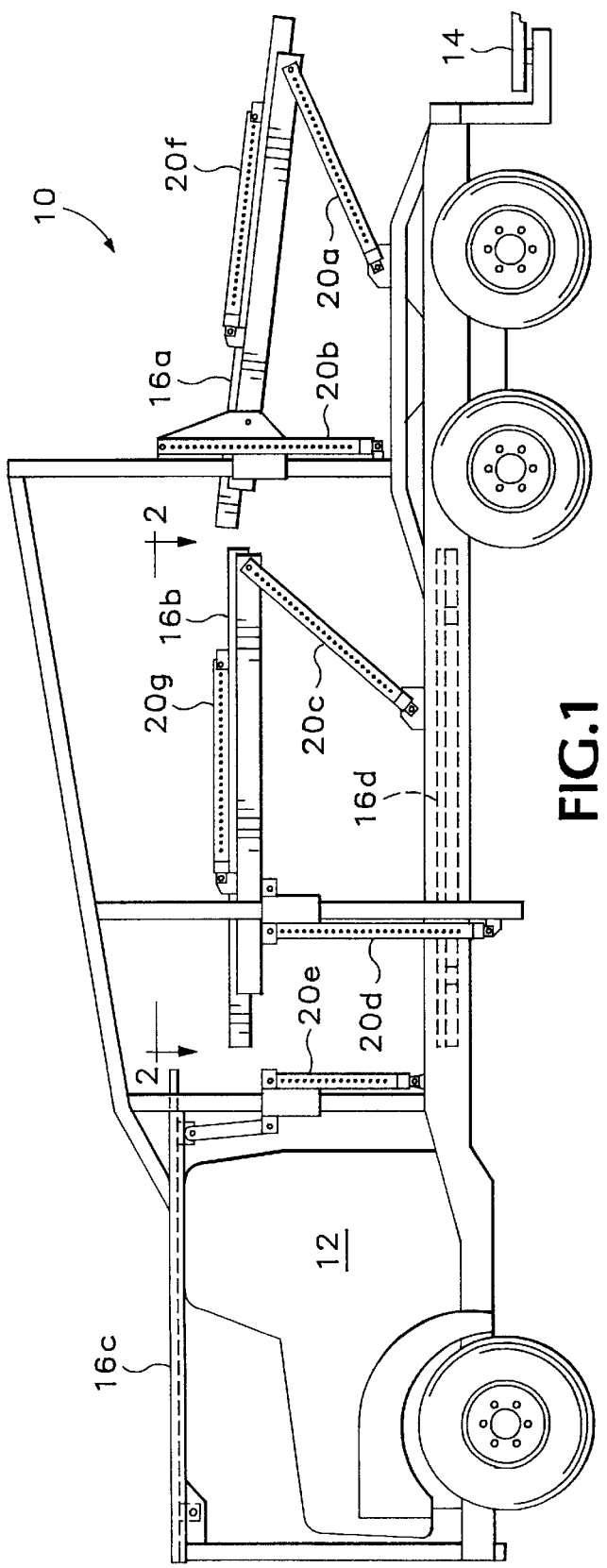
FIG. 1 is a simplified side view of an exemplary embodiment of a vehicle transporter in accordance with the present invention, with certain elements deleted for clarity.

An exemplary vehicle transporter incorporating the present invention, indicated generally as 10 in the simplified side view of FIG. 1, comprises an automobile-carrying truck unit 12 and an automobile-carrying trailer 14 (only the articulated hitch of the trailer being shown). Both the truck and trailer have comparable vehicle-support assemblies such as 16a, 16b, 16c and 16d, and comparable telescopically extensible and retractable fluid power cylinder assemblies such as 20a, 20b, 20c, 20d, 20e, 20f, and 20g for selectively moving the upper vehicle support assemblies to different adjustable positions at different elevations. The truck unit 12 is preferably capable of transporting four or five vehicles depending upon their sizes, and the trailer 14 is preferably equipped with a larger number of vehicle support members capable of transporting a larger number of vehicles.

The present invention can also be incorporated into many alternative configurations of vehicle transporters, having diverse other arrangements of vehicle support members as shown, for example, in U.S. Pat. Nos. 2,492,829, 3,650,416, 3,931,895, 4,668,141, 4,668,142, 4,789,281, 5,071,298, and 5,286,149, all of which are incorporated herein by reference. Any alternative configuration capable of being modified advantageously to incorporate the principles of the present invention, as so modified, is intended to be within the scope of the present invention.

Figure 2:
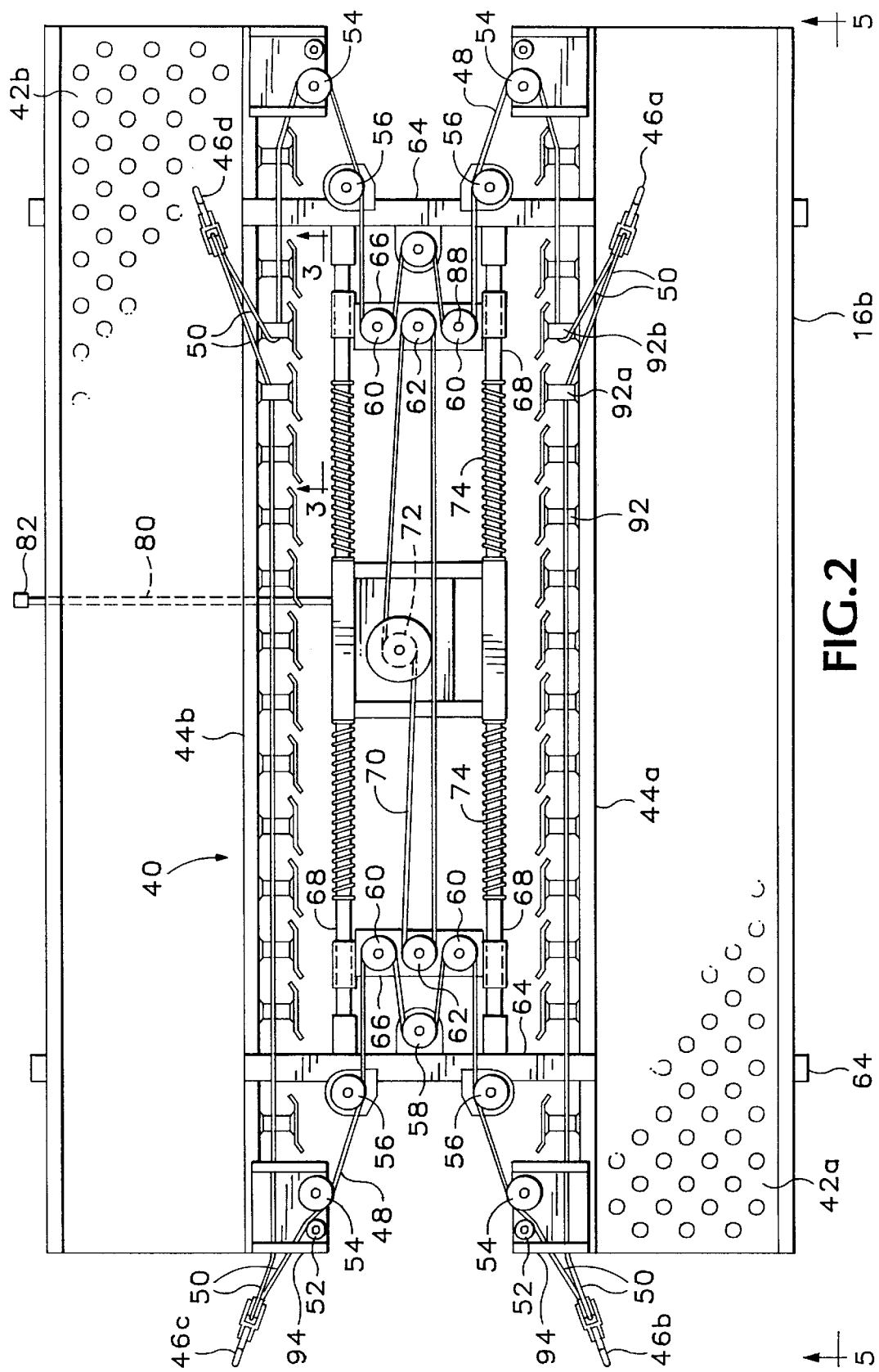
FIG. 2 is a top view of an exemplary tie-down apparatus, taken along line 2—2 of FIG. 1.

FIG. 2 shows a top view of an upper vehicle support assembly 16b and a tie-down apparatus 40. The vehicle support assembly 16b has two wheel-supporting ramps 42a and 42b and transversely-spaced opposite sides 44a and 44b. The transported vehicles are usually loaded onto the vehicle support assembly by driving the vehicles onto the ramps.

Figure 3:
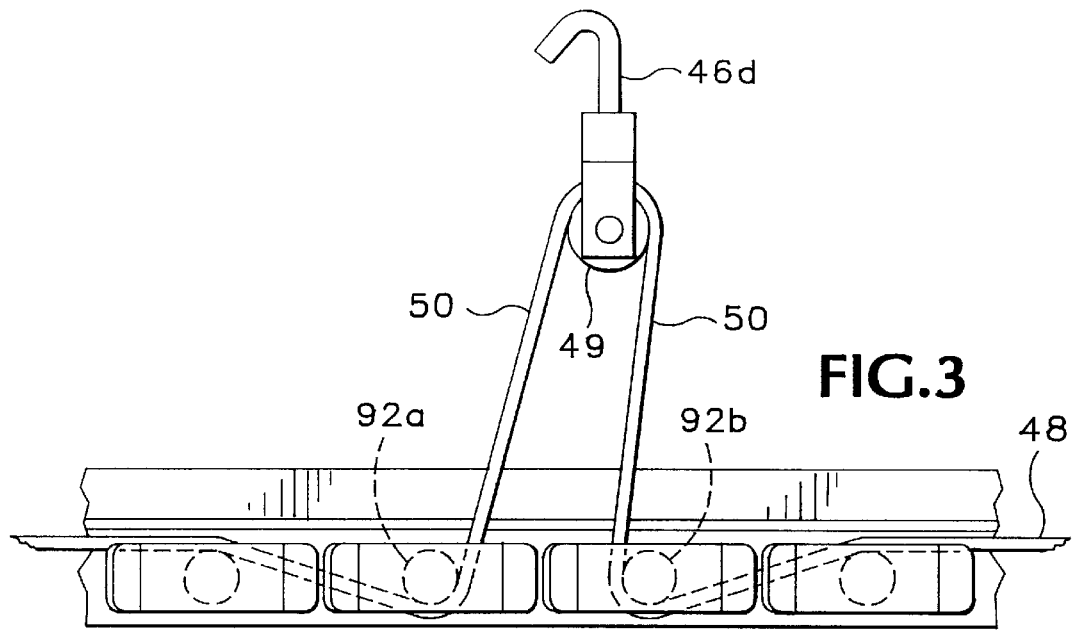
FIG. 3 is a detail view taken along line 3—3 of FIG. 2.

Four securement devices 46a, 46b, 46c and 46d are associated with the vehicle support assembly and attachable to a vehicle. FIG. 3 shows a side view of an exemplary securement device 46d. Manufacturers of various types of vehicles provide specifications for the particular type of securement devices that should be used and where such securement devices should be attached. The manufacturers of the vehicles typically provide holes or loops on the body of the vehicle for attachment of the securement devices. This allows for securement of the vehicles independently of securement of the wheels of the vehicle.

Returning to FIG. 2, the securement devices are preferably attached to the body of the vehicle with one securement device attached adjacent each of the four corners of the vehicle. FIG. 2 shows four securement devices arranged for attachment in such a fashion, with securement devices longitudinally-spaced and transversely-spaced.

A single continuous tension member 48 is interconnected with each of the four securement devices. Each securement device has a pulley 49 that engages the tension member 48, as is illustrated in side view in FIG. 3. Each securement device is thus movably engageable with respect to the tension member. In tie-down apparatus 40 the tension member is a ¼ inch diameter cable made of extra improved plow steel. This type of cable does not become deformed or bent upon being tightly wrapped about pulleys or rollers of sufficient diameter. Nevertheless, the cable should not be wrapped about pulleys less than 3 inches in diameter. Other tension members could be used, such as chains or cables of different diameters.

Respective tension member portions are attached to each securement device for exerting a pull-down force, each including at least two side-by-side cable parts 50. Thus, the resultant pull-down force exerted on the securement device is twice the tension in the tension member 48. It is preferred that the resultant pull-down force exerted at each securement device be about 1000 pounds, requiring a tension in the cable 48 of about 500 pounds. However, the amount of tension to be applied will depend upon the size and weight of the vehicle being secured.

FIG. 2 shows the tension member 48 between securement devices 46b and 46c engaging pulleys 52, 54, 56, 58, and 60. All such pulleys except 60 are fixedly mounted to the vehicle support assembly. Pulleys 60 are mounted to movable carriages 66. The movable carriages 66 are slidably mounted on two parallel tubes 68 fixed to cross-members 64 of the vehicle support assembly. A middle pulley 62 is mounted to each carriage. A cable 70 engages the middle pulleys 62 and connects to respective upper and lower winding hubs 72 which are interconnected to rotate in unison. FIG. 5 shows the two hubs 72 in a side view. Returning to FIG. 2, one end of the cable 70 is connected to one of the hubs 72, and the other end of the cable 70 is connected to the other hub 72 so that as the hubs 72 rotate, the ends of the cable 70 are simultaneously wrapped about each hub or unwrapped, depending on the direction of rotation of the hubs.

In operation, the hubs 72, cable 70, carriages 66, middle pulley 62 and pulleys 52, 54, 56, 58 and 60 function as a tension-applying mechanism interconnected with each tension member portion to adjust the pull-down force on each of the securement devices. When the hubs 72 are rotated so that each end of the cable 70 is simultaneously wrapped about the hubs 72, the cable 70 therefore pulls on the middle pulleys 62 causing both movable carriages 66 to move toward the hubs 72 along the tubes 68. The pulleys 60, likewise attached to the carriages 66, accordingly pull the tension member 48, thus adjusting the tension in the tension member 48 and the pull-down force exerted by the tension member 48 on the securement devices 46a, b, c and d.

Each tube 68 has respective coiled springs 74 around the tube 68 located between the hub 72 and a respective carriage 66. In operation, when the vehicle is being secured, the movable carriages 66 are pulled inward against the springs 74. The springs provide a resistive force so that the carriages 66 will be pulled in equally and simultaneously. This enables the carriages 66 automatically to take up unequal slack that may be in the tension member on one side of the tie-down apparatus. The springs 74 also aid in the loosening of the tension member 48, as the springs 74 push the carriages 66 away from the hubs 72 as the hubs rotate to unwrap the cable 70.

Figure 4:
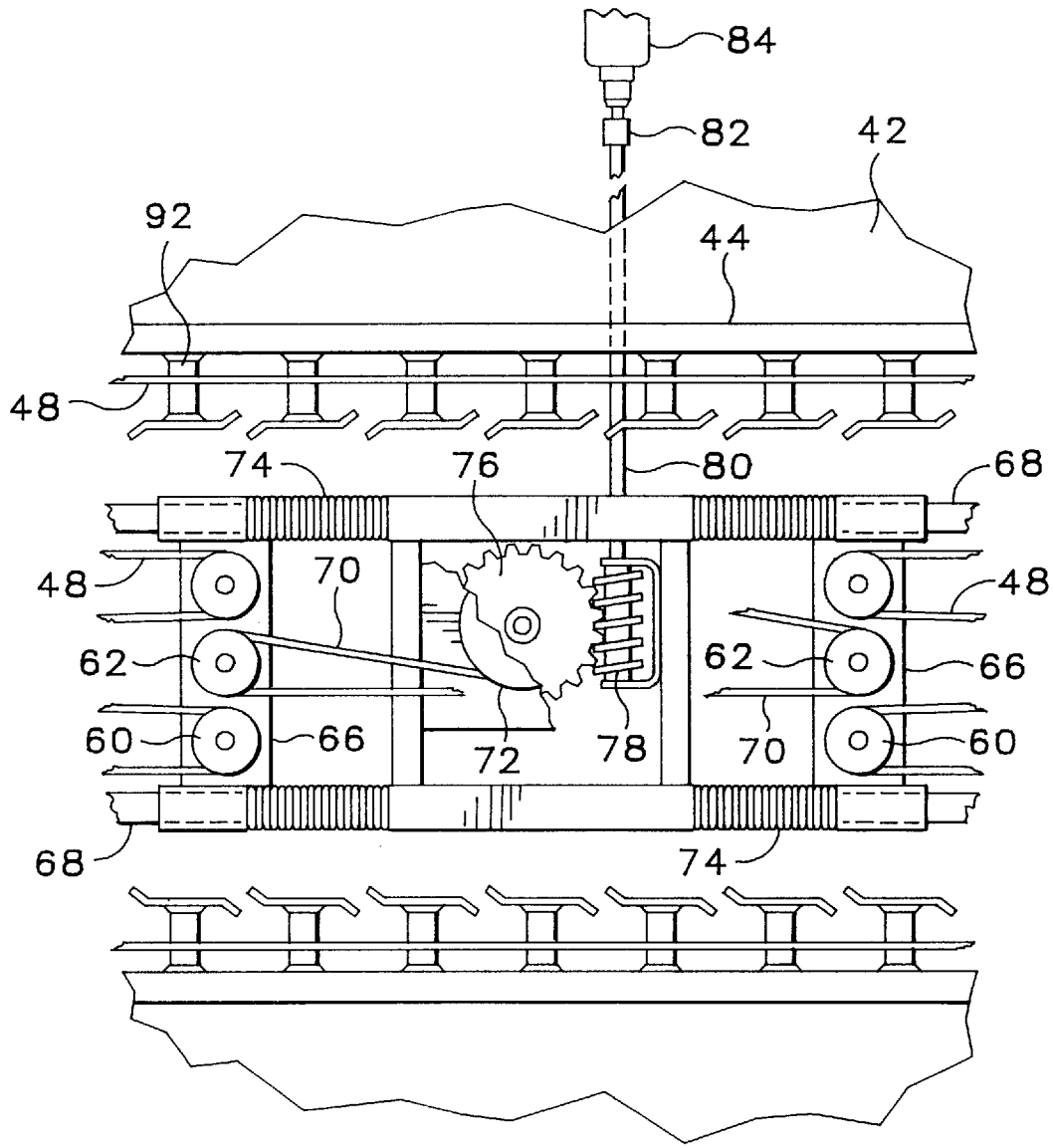
FIG. 4 is a top detail view of a central portion of FIG. 2 in a tightened condition.

Referring to FIG. 4, a gear 76 is connected to and rotates with the hubs 72. The gear 76 is engaged with a worm gear 78. The ratio of the worm gear 78 rotation to the gear 76 rotation is 60:1. This ratio is such that the worm gear 78 functions as an automatic lock for the hubs 72, preventing the hubs 72 from rotating and thus loosening the tension applied to the tension member 48, unless the hubs 72 are rotated by the worm gear 78.

The worm gear 78 is connected to a shaft 80 which has a fitting 82 welded to the end. The fitting 82 is matingly engageable with an air wrench 84. In tie-down apparatus 40, the air wrench 84 includes a conventional integral torque limiter. The torque limiter can be adjustably preset to prevent the air wrench from applying more than a predetermined amount of torque to the shaft 80. This operates as a tension-limiting mechanism capable of automatically limiting each pull-down force, exerted by each respective tension member portion, to a predetermined amount of force. Alternatively, a conventional torque-limiting clutch could be inserted into the drive mechanism for the hubs 72 to perform a comparable function.

Other alternatives could be used to apply tension to the tension members. For example, the carriages could be mounted on oppositely threaded rods which rotate to move the carriages toward or away from each other. The carriages could be moved using other arrangements of cables and hubs, for example using a single hub connected with each carriage. Hydraulic or pneumatic systems could also be used to move the carriages. Other alternatives could apply tension directly to the tension member 48, for example by connecting the tension member to a rotating hub, to a moving set of pulleys, to a winch, or some other device used for tightening.

Referring to FIG. 2, once tension has been applied to the tension member 48, the tension member portions 50 transfer tension to the securement devices. The carriages 66 and pulleys 52, 54, 56, 58 and 60 operate as a tension-equalizing mechanism, capable of automatically substantially equally distributing tension applied by the tension-applying mechanism among each tension member portion, to substantially equalize the pull-down force automatically with respect to the four securement devices.

Each carriage 66 is selectively movable with respect to the vehicle support assembly 16b and the axis of a respective pulley 58 along a direction substantially perpendicular to such axis, in response to adjustment of the pull-down force by the tension-applying mechanism. This operates as a tension member storage assembly to variably store a length of the tension member 48 in response to adjustment of the tension in the tension member. Such a storage system is highly preferable to a winding drum or winch which would cause deformation and wear of the tension member 48 through repeated windings.

The tie-down apparatus used for the upper vehicle support assemblies, such as 16b, includes a row of fasteners 92 mounted on the vehicle support assembly 16b at different longitudinally-spaced positions adjacent each of the opposite sides 44a, 44b. The fasteners 92 are preferably idler rollers, each detachably engageable with the tension member 48. In FIG. 2, the tension member 48 rides along the top of the fasteners 92. The tension member may be selectively engaged with any two fasteners, such as 92a and 92b, by being placed under the two adjacent fasteners illustrated in side view in FIG. 3. The tension member 48 may be thus engaged with any selected adjacent ones of the longitudinally-spaced fasteners 92 so that the tension member may exert its pull-down force on its securement device at a longitudinal inclination with respect to the vehicle support assembly. This enables both tension member portions interconnected with a pair of longitudinally-spaced securement devices to exert their pull-down forces at respective opposing longitudinal inclinations, as exemplified by FIG. 5, regardless of changes in longitudinal spacings of the respective securement devices necessitated by different vehicle lengths. In tie-down apparatus 40 each tension member portion interconnected with each respective pair of longitudinally-spaced securement devices is preferably selectively engageable with the fasteners 92 at different longitudinally-spaced positions. If desired, the tension member portions connected to securement devices 46b and 46c can be moved from engagement with roller fasteners 94 to engagement with fasteners 92.

By engaging the tension member 48 with selected fasteners 92 to achieve longitudinally opposed, inclined pull-down forces, the vehicle may be longitudinally secured so that it will not move longitudinally in response to braking or acceleration of the vehicle transporter despite the absence of wheel chocks. The tension member portions can be attached to the securement devices and the fasteners 92 to provide opposing longitudinal inclinations of each pull-down force either toward the center of the vehicle support assembly, as illustrated by FIG. 5, or away from the center of the vehicle support assembly.

Figure 7:
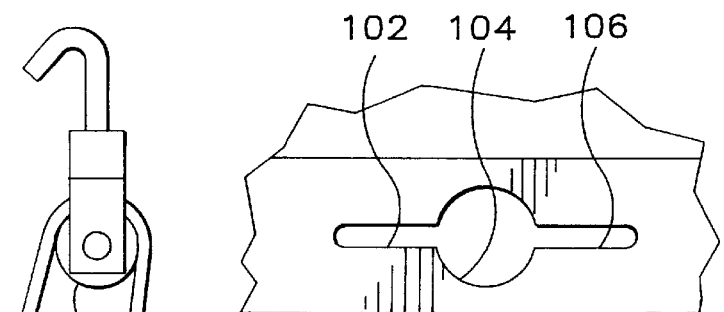
FIG. 7 is a detail view taken along line 7—7 of FIG. 6.
Figure 6:
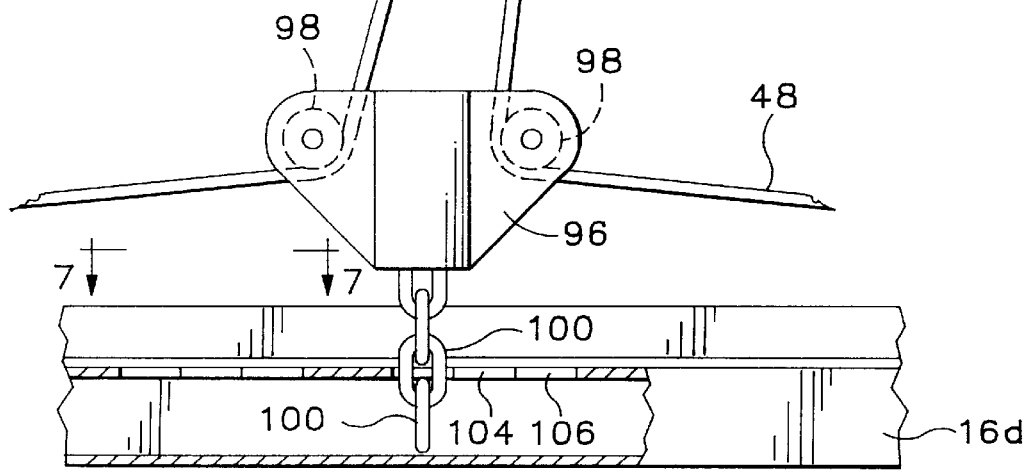
FIG. 6 is a detail view of a portion of an alternative tie-down apparatus.

FIG. 6 shows an alternative movable fastener 96 which is preferred for the lower vehicle support assemblies, such as vehicle support assembly 16d in FIG. 1, where it would be difficult to access fixed fasteners 92 from beneath the vehicle support assembly. If desired, for the sake of convenience or uniformity, fasteners such as 96 may also be used for the upper vehicle support assemblies. The movable fastener 96 has two pulleys 98 which engage the tension member 48. Attached to the bottom of the movable fastener 96 are chain links 100. The vehicle support assembly 16d has a row of longitudinally-spaced keyholes 102 (FIG. 7) on each opposite side. The chain links 100 fit into the center hole 104 of the keyhole 102. At least one chain link 100 is then placed below the narrow slot 106 to prevent the movable fastener 96 from moving with respect to the vehicle support assembly. The securement device is attached to the vehicle and a keyhole 102 is selected so that the longitudinal inclination of the pull-down force pulls the chain link away from the center hole 104.

In tie-down apparatus 40 the tension member portions 50 are each connected to form a single tension member, which is a unitary cable. Alternative arrangements of tension members and tension-applying mechanisms are possible within the scope of the present invention. These alternative arrangements may be used when the vehicle support ramps are not flat, or when other structures prevent the use of a single cable.

Figure 8:
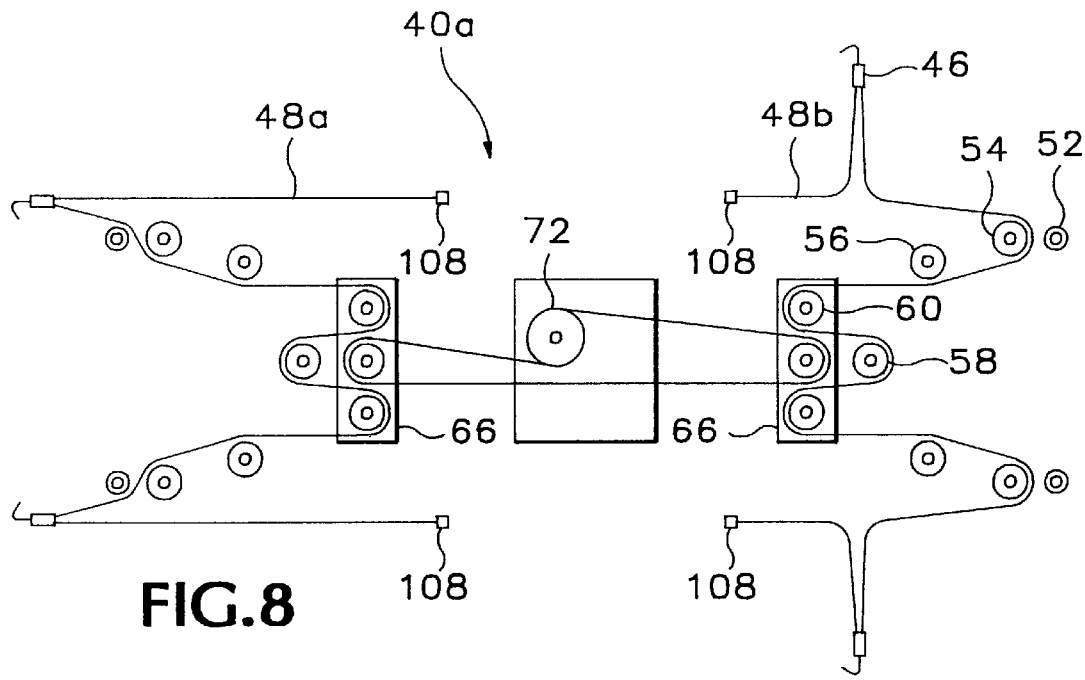
FIG. 8 is a schematic view of a further alternative tie-down apparatus in accordance with the present invention.

For example, FIG. 8 shows a schematic of one possible alternative. In that alternative, the tie-down apparatus 40a has two tension members 48a and 48b. The ends of each tension member are attached to the vehicle support assembly at securement points 108.

Figure 9:
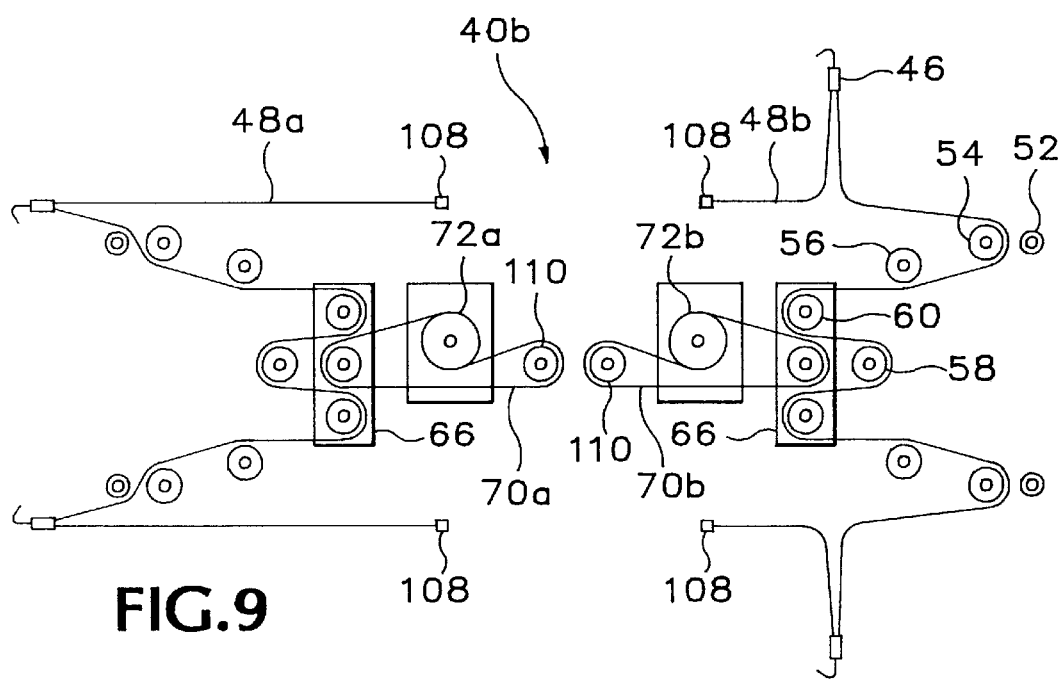
FIG. 9 is a schematic view of a further alternative tie-down apparatus in accordance with the present invention.

In another alternative shown in schematic view in FIG. 9, the tie-down apparatus 40b has two sets of dual hubs 72a and 72b. The tie-down apparatus has two additional pulleys 110, fixed to the vehicle support assembly, about which cables 70a and 70b are wrapped. Each set of hubs 72a, 72b may be rotated independently of the other set of hubs. This is useful for applications involving lengthy tension members where large amounts of slack must be taken up in the tension member to secure the vehicle. Despite the fact that a single set of hubs does not interconnect the two carriages 66, the embodiment of FIG. 9 is nevertheless able to equalize the pull-down forces automatically on all four securement devices because the longitudinally-spaced pairs of securement devices pull longitudinally against each other through the vehicle, due to their opposing inclinations. Thus, rotation of either set of hubs 72a or 72b can equalize all four pull-down forces.

Figure 10:
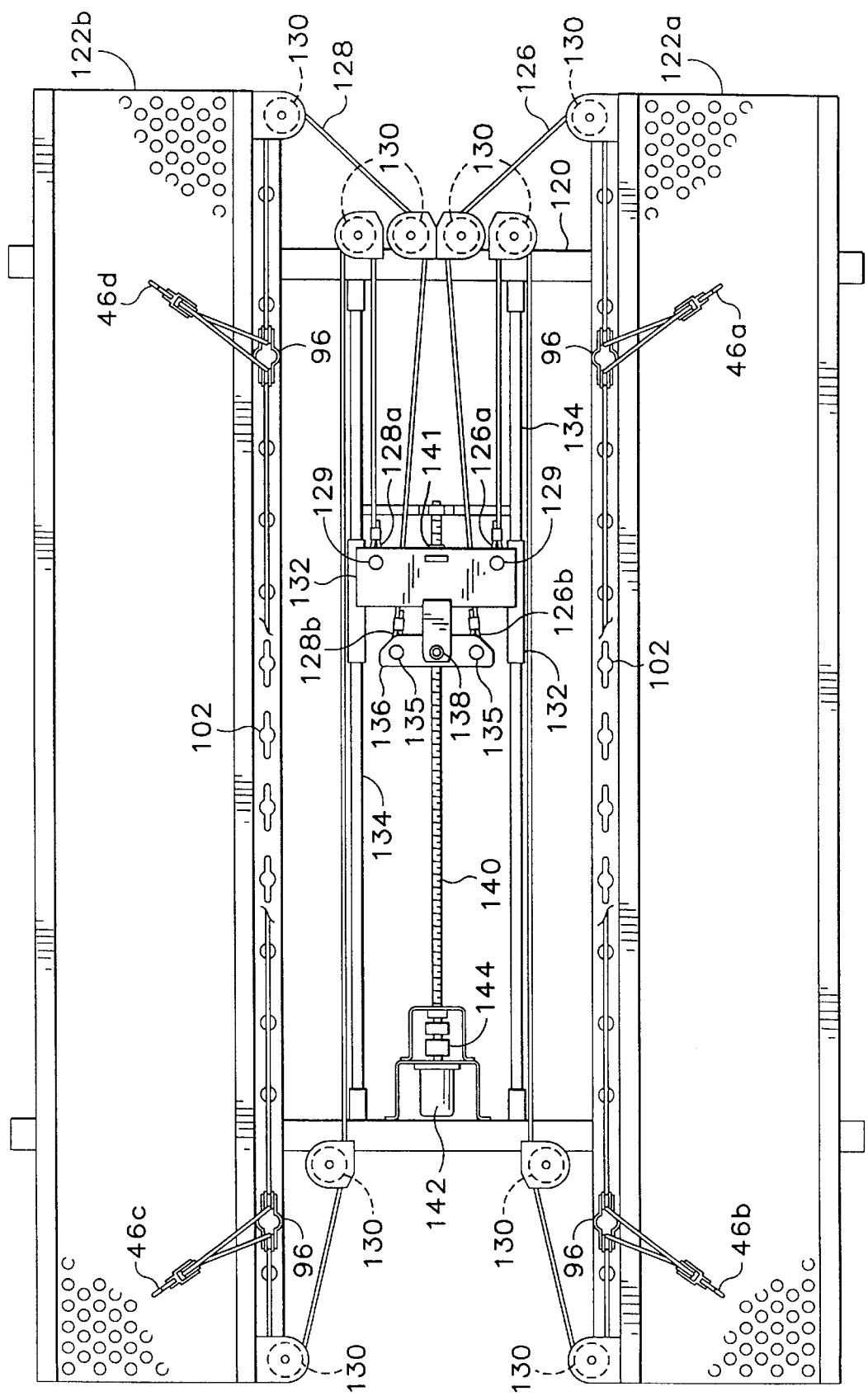
FIG. 10 is a top view of an exemplary further alternative tie-down apparatus in accordance with the present invention.
Figure 11:
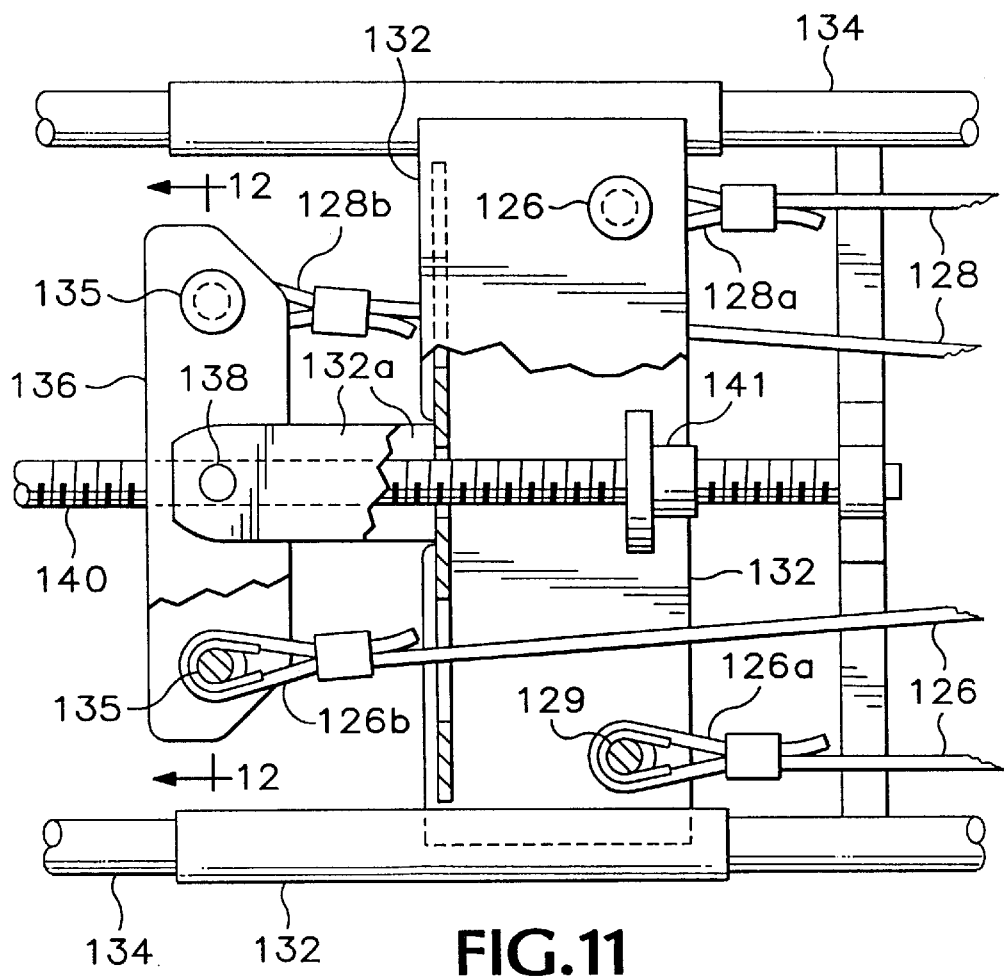
FIG. 11 is an enlarged partially sectional top view of a portion of the tie-down apparatus of FIG. 10.
Figure 12:
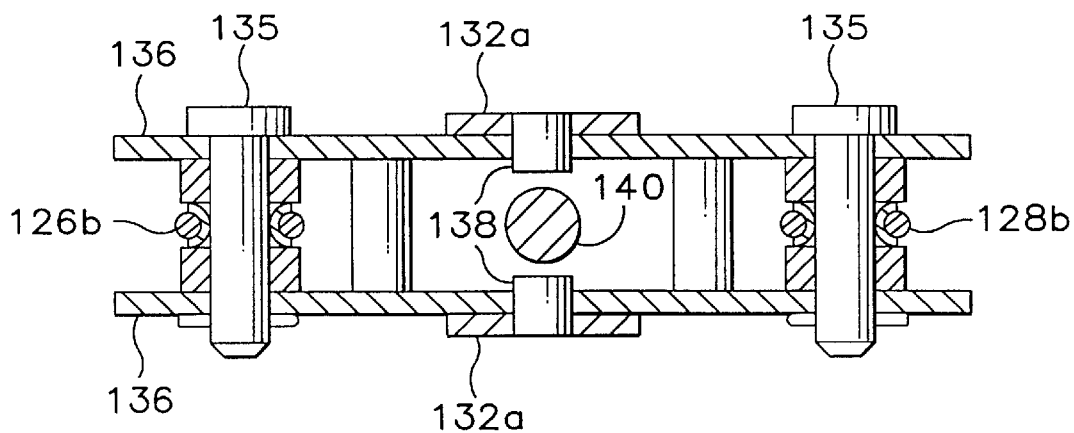
FIG. 12 is a sectional view along line 12—12 of FIG. 11.

FIGS. 10, 11 and 12 show an exemplary embodiment of a further alternative tie-down apparatus in accordance with the present invention. Although this particular embodiment depicts the movable fasteners 96 and mating longitudinally-spaced keyholes 102 shown in FIGS. 6 and 7, it could alternatively utilize fixed fasteners such as 92 of FIG. 2. The vehicle support assembly 120 has two wheel-supporting ramps 122a and 122b, and four vehicle securement devices 46a, 46b, 46c and 46d. Each longitudinally-spaced pair of securement devices, 46a and 46b on one side, and 46c and 46d on the other side, is interconnected by a respective separate tension member 126 or 128, each of which is preferably a cable wound about respective pulleys 130 rotatably mounted on the vehicle support assembly 120. One end 126a, 128a of each tension member engages a respective pin 129 fixed to a movable carriage 132 slidably mounted on two parallel tubes 134 on the vehicle support assembly 120. The opposite end 126b, 128b of each tension member engages a respective pin 135 of a rocking beam assembly 136 pivotally attached to the carriage 132 by upper and lower pivot pins 138 on a clevis 132a which is part of the carriage 132. The carriage 132 is selectively movable longitudinally with respect to the vehicle support assembly 120 by means of a reversible screw member 140 threaded through a nut 141 affixed to the carriage 132. The pitch of the screw threads is sufficiently small, e.g., about ¼ inch pitch, to prevent the carriage 132 from moving unless the screw member is rotatably driven. The screw member 140 is selectively driven bidirectionally by a rotary hydraulic motor 142, preferably acting through an adjustable torque-limiting coupling 144 which operates as a tension-limiting mechanism for the pull-down forces. The torque-limiting coupling 144 may, for example, be an adjustable torque-limiting coupling marketed under the trademark PERF-A-TORQ by X-4 Tool Division of Geartronics Industries Incorporated of North Billerica, Mass. Preferably, the coupling 144 is adjusted so as to limit torque to approximately 35 foot pounds. Alternatively, torque could be limited by adjustably limiting the pressure of input fluid to the motor 142 or, if the motor were electric, by adjustably limiting the current through the motor. As a further alternative the motor could be pneumatic, either of a permanently installed type or of a portable air wrench type as discussed previously.

In operation, the screw 140, carriage 132, rocking beam assembly 136, and pulleys 130 function as a tension-applying mechanism interconnected with each tension member portion to adjust the pull-down force on each of the securement devices. When the screw 140 is turned by the hydraulic motor 142 in a direction to pull the carriage 132 toward the hydraulic motor 142, the ends 126a, 126b and 128a, 128b of the respective cables 126 and 128 are likewise pulled, thus adjusting the tension in each of the tension members 126, 128 and the resultant pull-down forces exerted by the tension members on the securement devices 46a, b, c and d. The adjustable torque-limiting coupling 144 automatically limits each pull-down force. The carriage 132, with its rocking beam assembly 136, operates as a tension-equalizing mechanism between the respective tension members 126 and 128, thereby automatically substantially equally distributing tension among each tension member portion to substantially equalize the pull-down forces automatically with respect to the four securement devices.

Unlike the previously described embodiments, the rocking beam 136, although equalizing the pull-down forces on each side of the tie-down apparatus, nevertheless isolates the respective tension members 126 and 128 from each other mechanically so that, if one tension member on one side of the apparatus should break, the other will remain intact to prevent the secured vehicle from rolling excessively forward or rearward on the vehicle support assembly 120. The intact tension member will loosen slightly if one end of the rocking beam assembly 136 is freed by the breakage of the opposite tension member, but such loosening is insufficient to permit any significant forward or rearward movement of the vehicle since the maximum pivoting of the rocking beam assembly 136 under such circumstances is limited. Because of this mechanical isolation of the securement devices on the respective sides of the tie-down apparatus, the vehicle support assembly 120 may be safely tilted significantly to orient the vehicle in the most compact arrangement relative to the other vehicles on the transporter, and thereby maximize the payload of the transporter.

The need for only a single movable carriage 132 makes the embodiment of FIGS. 10, 11 and 12 also simpler and more economical to fabricate than the previously-described embodiments.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A tie-down apparatus for securing a vehicle to a longitudinally-extending elongate vehicle transporter, comprising:

(a) a vehicle support assembly;

(b) at least four variably positionable securement devices associated with said vehicle support assembly and attachable to said vehicle;

(c) a respective flexible tension member portion interconnected with a respective one of each of said four securement devices to enable nonuniform variations in relative positions of said securement devices, each tension member portion capable of exerting a pull-down force on a respective one of said securement devices;

(d) a tension-applying mechanism interconnected with each said tension member portion to adjust said pull-down force on each of said securement devices; and (e) a tension-equalizing mechanism, interconnected with each said tension member portion, capable of automatically distributing tension applied by said tension-applying mechanism among each said tension member portion so as to substantially equalize said pull-down force automatically with respect to said four securement devices despite nonuniform variations in the relative positions of said securement devices.

2. The apparatus of claim 1 wherein said securement devices are both longitudinally-spaced and transversely-spaced with respect to each other, and said tension-equalizing mechanism interconnects respective transversely-spaced ones of said securement devices in tension while also interconnecting respective longitudinally-spaced ones of said securement devices in tension.

3. The apparatus of claim 2, including at least two pairs of longitudinally-spaced ones of said securement devices, said tension-equalizing mechanism being disconnectable in tension from one of said pairs while nevertheless being connected in tension to the other of said pairs.

4. The apparatus of claim 2 wherein said tension-equalizing mechanism interconnects respective longitudinally-spaced ones of said securement devices in tension independently of any interconnection thereof through said vehicle.

5. The apparatus of claim 2 wherein said tension-equalizing mechanism interconnects respective longitudinally-spaced ones of said securement devices in tension through said vehicle.

6. The apparatus of claim 2 wherein each respective tension member portion interconnected with transversely-spaced ones of said securement devices is selectively engageable with said vehicle support assembly at different alternative longitudinally-spaced positions, permitting the selection of said different alternative longitudinally spaced positions so that each said tension member portion exerts said pull-down force at a respective longitudinal inclination longitudinally opposing that of an other respective tension member portion, regardless of changes in longitudinal spacings between longitudinally-spaced ones of said securement devices.

7. The apparatus of claim 1 wherein said vehicle has wheels and said securement devices are attachable to said vehicle independently of said wheels.

8. The apparatus of claim 1 including a tension-limiting mechanism interconnected with said tension-applying mechanism and capable automatically of limiting each said pull-down force exerted by each respective tension member portion to a predetermined amount of force while concurrently exerting each said respective pull-down force.

9. The apparatus of claim 1 wherein each tension member portion is connected to a single tension member.

10. The apparatus of claim 1 wherein each said tension member portion exerts said pull-down force by exerting a tension force in each of at least two side-by-side parts of each tension member portion so that each said respective pull-down force exceeds said tension force in each of said side-by-side parts.

11. A tie-down apparatus for securing a vehicle to a longitudinally-extending elongate vehicle transporter, comprising:
(a) a vehicle support assembly;
(b) a securement device associated with said vehicle support assembly and attachable to said vehicle;
(c) a flexible tension member portion interconnected with said securement device, said tension member portion capable of exerting a pull-down force on said securement device;
(d) a tension-applying mechanism interconnected with said tension member portion to adjust said pull-down force; and
(e) a tension-limiting mechanism interconnected with said tension-applying mechanism and capable automatically of limiting said pull-down force exerted by said tension member portion to a predetermined amount while concurrently exerting said pull-down force.

12. The apparatus of claim 11, including a further securement device attachable to said vehicle and longitudinally-spaced from said securement device, and a further tension member portion interconnected with said further securement device, said further tension member portion capable of exerting a further pull-down force on said further securement device, at least one tension member portion selectively engageable with said vehicle support assembly at different alternative longitudinally spaced positions permitting the selection of said different alternative longitudinally spaced positions so that each tension member portion exerts its pull-down force at a longitudinal inclination longitudinally opposing that of the other tension member portion, regardless of changes in longitudinal spacings between securement devices.

13. A tie-down apparatus for securing a vehicle to a longitudinally-extending elongate vehicle transporter, comprising:
(a) a vehicle support assembly;
(b) at least four securement devices associated with said vehicle support assembly and attachable to said vehicle;
(c) a respective flexible tension member portion interconnected with a respective one of each of said four securement devices, each tension member portion capable of exerting a pull-down force on a respective one of said securement devices;
(d) a tension-applying mechanism interconnected with at least a pair of said tension member portions to adjust said pull-down force on each of at least a pair of said securement devices;
(e) each said tension member portion being capable of exerting said pull-down force by exerting a tension force in each of at least two side-by-side parts of each tension member portion so that each said respective pull-down force exceeds said tension force in each of said side-by-side parts; and
(f) each tension member portion interconnected with each of at least two of said securement devices is selectively engageable with said vehicle support assembly at different alternative longitudinally spaced positions.

14. The apparatus of claim 13 wherein tension-applying mechanism is interconnected with said four tension member portions to adjust said pull-down force on each of said four securement devices.

15. The apparatus of claim 13, including a respective fastener mounted on said vehicle support assembly at each of said different alternative longitudinally spaced positions, each fastener detachably engageable with a respective tension member portion.

16. The apparatus of claim 13, including a movable fastener selectively and detachably engageable with said vehicle support assembly at any of said different alternative longitudinally spaced positions, said fastener movably engaging a respective tension member portion.

17. A tie-down apparatus for securing a vehicle to a longitudinally-extending elongate vehicle transporter, comprising:
(a) a vehicle support assembly;
(b) a securement device associated with said vehicle support assembly and attachable to said vehicle;
(c) a flexible tension member portion interconnected with said securement device, said tension member portion capable of exerting a pull-down force on said securement device;
(d) a tension-applying mechanism interconnected with said tension member portion to adjust said pull-down force; and
(e) a tension member storage assembly having at least one pulley about which said tension member portion is wrapped, said pulley having a rotational axis supported by said vehicle support assembly, and a carriage selectively movable with respect to said vehicle support assembly and said axis along a direction substantially perpendicular to said axis in response to adjustment of said pull-down force by said tension-applying mechanism, said carriage engaging said tension member portion so as to variably store a length of said tension member portion between said carriage and said pulley.

18. The apparatus of claim 17 wherein said carriage is movable longitudinally with respect to said vehicle support assembly.

19. The apparatus of claim 17, including a further pulley about which said tension member is wrapped, said further pulley having a further rotational axis with respect to which said carriage is movable along said direction.

\* \* \* \* \*